United States Patent
Chachra et al.

(10) Patent No.: US 7,753,816 B2
(45) Date of Patent: Jul. 13, 2010

(54) HYBRID TRANSMISSION SYSTEM

(75) Inventors: Deepak Chachra, Mumbai (IN); Bhartendu Seth, Mumbai (IN)

(73) Assignee: India Institute of Technology Bombay (IN)

( * ) Notice: Subject to any disclaimer, the term of this patent is extended or adjusted under 35 U.S.C. 154(b) by 439 days.

(21) Appl. No.: 11/576,689

(22) PCT Filed: Sep. 14, 2005

(86) PCT No.: PCT/IN2005/000312

§ 371 (c)(1),
(2), (4) Date: Apr. 4, 2007

(87) PCT Pub. No.: WO2006/038224

PCT Pub. Date: Apr. 13, 2006

(65) Prior Publication Data
US 2007/0254762 A1    Nov. 1, 2007

(30) Foreign Application Priority Data
Oct. 8, 2004    (IN) .................. 1075/MUM/2004

(51) Int. Cl.
*F16H 3/72* (2006.01)
*F16H 37/06* (2006.01)
*B60K 6/445* (2007.10)
*B60K 1/00* (2007.10)

(52) U.S. Cl. ............ 475/5; 475/4; 74/661; 180/65.235; 180/65.7; 903/910; 903/911

(58) Field of Classification Search ............ 475/4, 475/5, 72, 73, 83; 903/910, 911; 180/65.22, 180/65.235, 65.7, 165
See application file for complete search history.

(56) References Cited

U.S. PATENT DOCUMENTS

| 5,643,121 | A | * | 7/1997 | Greenwood et al. ........... 475/72 |
| 5,730,676 | A | | 3/1998 | Schmidt |
| 5,890,981 | A | * | 4/1999 | Coutant et al. ................ 475/72 |
| 5,957,798 | A | * | 9/1999 | Smith et al. .................... 475/5 |
| 6,010,422 | A | * | 1/2000 | Garnett et al. ................. 475/5 |
| 6,592,484 | B1 | | 7/2003 | Tsai et al. |
| 7,081,060 | B2 | * | 7/2006 | Hata et al. ..................... 475/5 |
| 7,172,524 | B2 | * | 2/2007 | Moeller ......................... 475/5 |
| 2006/0111211 | A1 | * | 5/2006 | Kefti-Cherif et al. ........... 475/5 |

FOREIGN PATENT DOCUMENTS

DE    196 06 771 A1    8/1997

* cited by examiner

*Primary Examiner*—Tisha D Lewis
(74) *Attorney, Agent, or Firm*—DeMont & Breyer, LLC

(57) ABSTRACT

A transmission system comprising two degrees-of-freedom compound planetary gear train with two conjoined planetary gear trains and four torque-transfer devices. The different combinations of states of various torque-transfer devices yield multiple modes of operation. The planetary gear train allows the addition of power of two prime-movers to drive the load. Additionally, the transmission system can split the power from one prime-mover into requirements of the energy storage system while catering to the output needs. This limits the re-circulating power to a fraction of the input power. Other advantage of the transmission is that it provides a high overdrive ratio, which permits regeneration even at moderate speeds. The transmission obviates the need for a torque converter. The transmission can operate as multi-speed, fully automatic.

9 Claims, 8 Drawing Sheets

Transmission for hybrid system

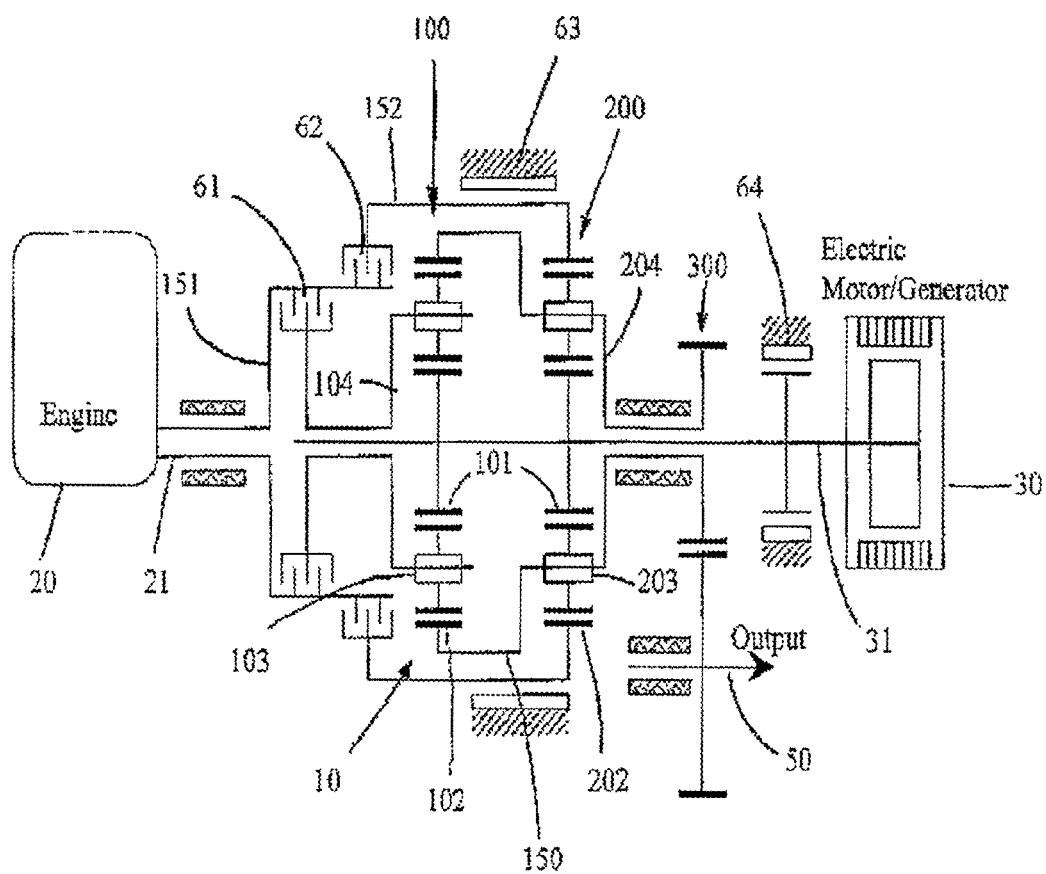
Fig. 1: Principal embodiment of U.S. 6,592,484
(Prior Art)

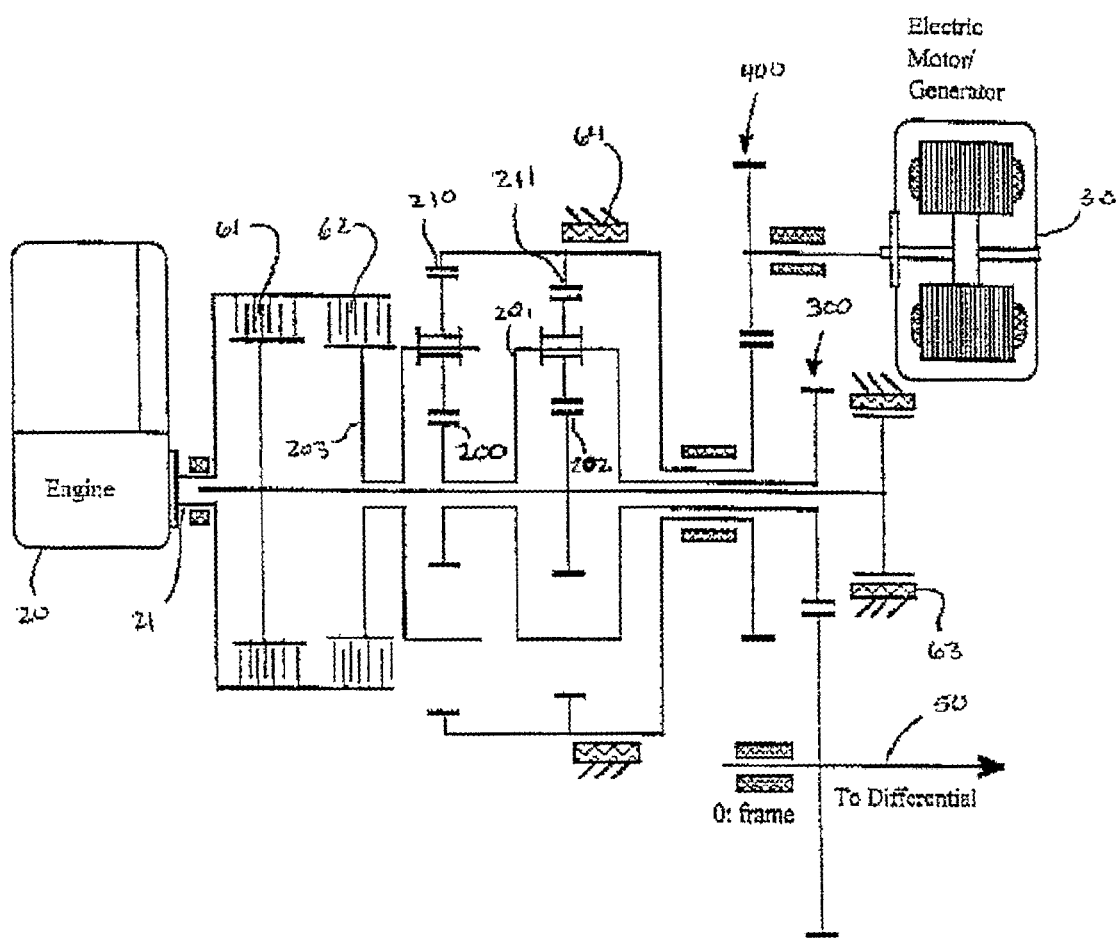
Fig. 2: Alternate embodiment of U.S. 6,592,484
(Prior Art)

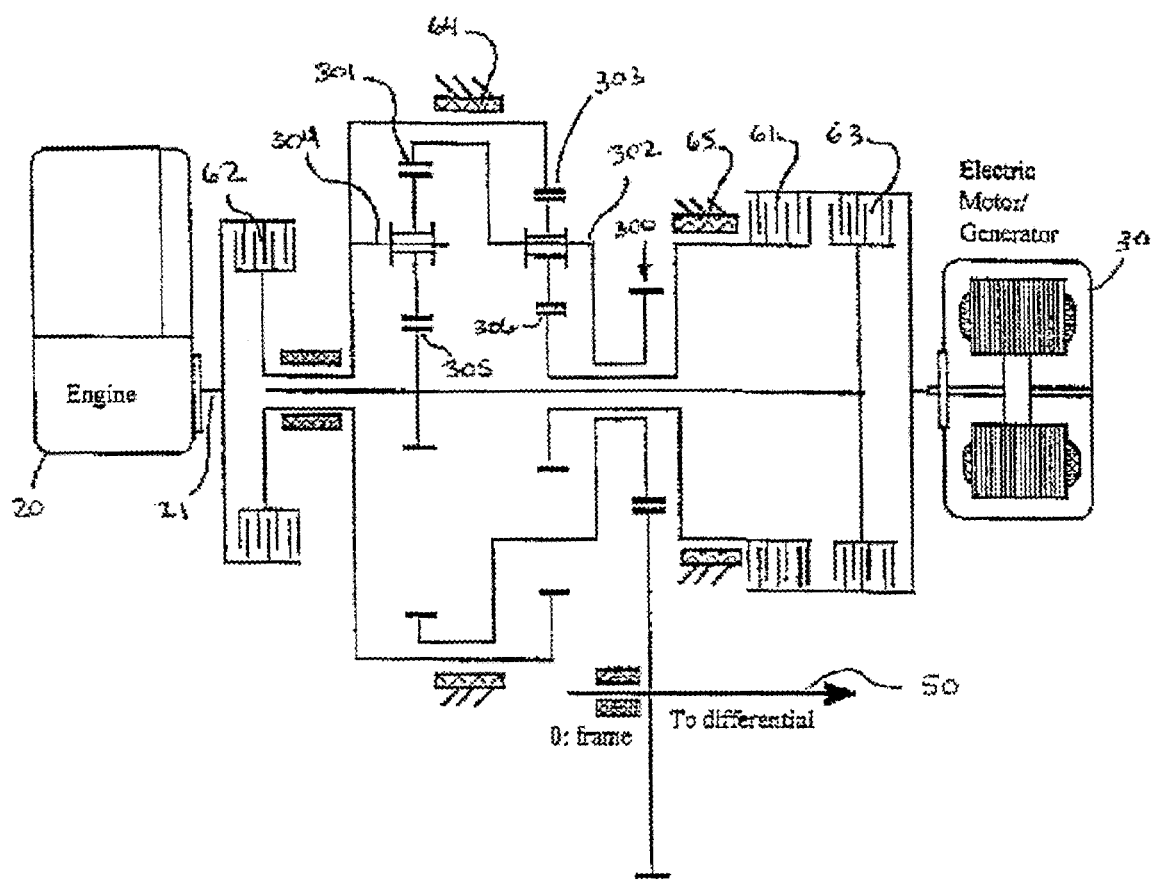
Fig. 3: Alternate embodiment of U.S. 6,592,484
(Prior Art)

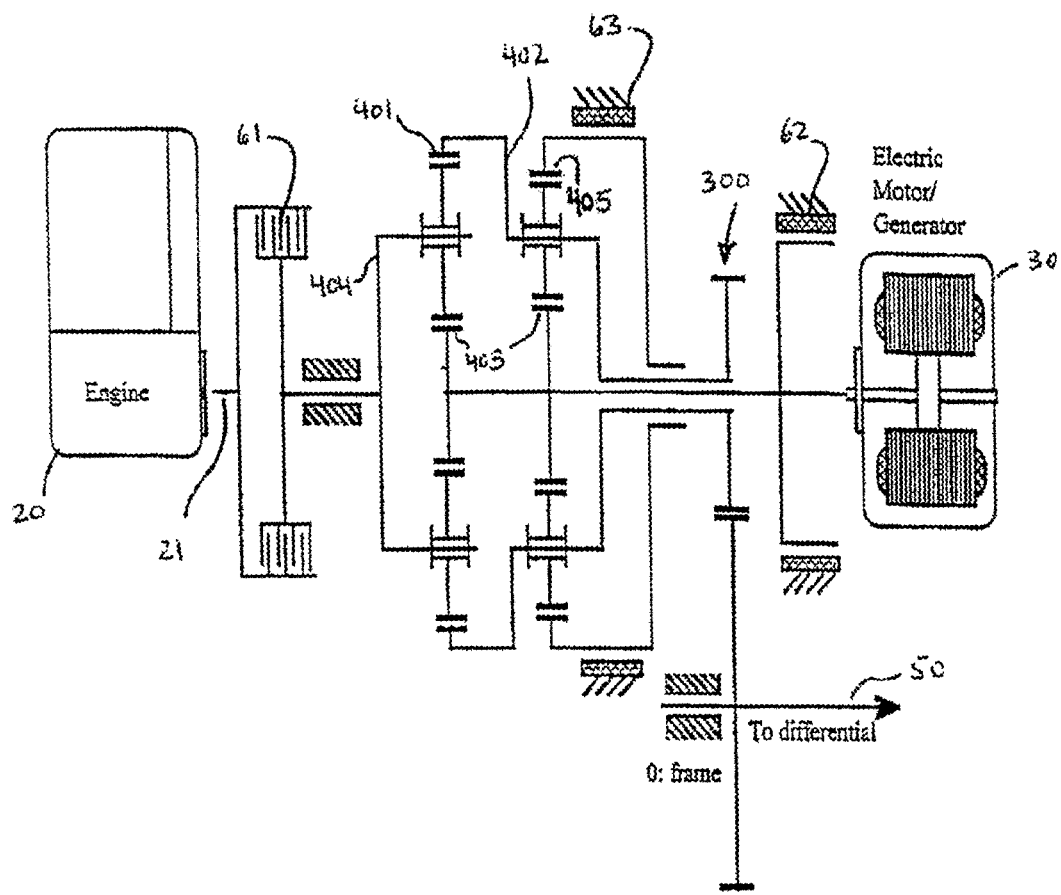
Fig. 4: Alternate embodiment of U.S. 6,592,484
(Prior Art)

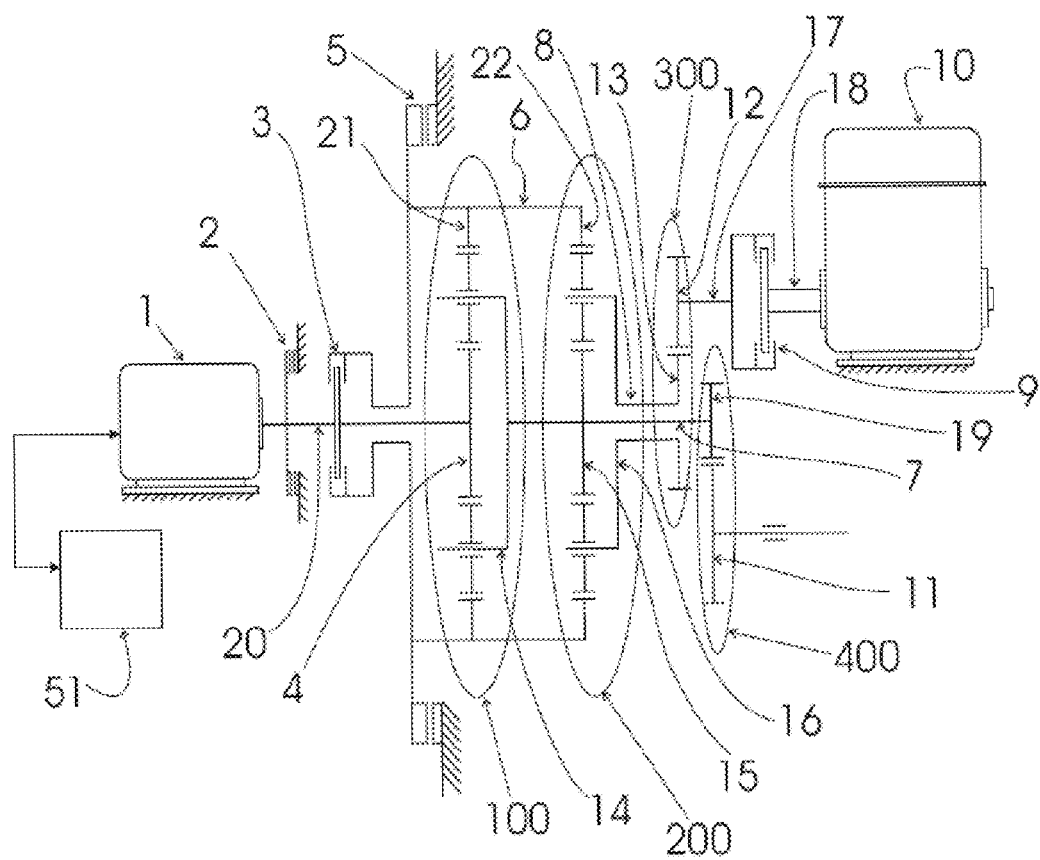
Fig. 5: Transmission for hybrid system

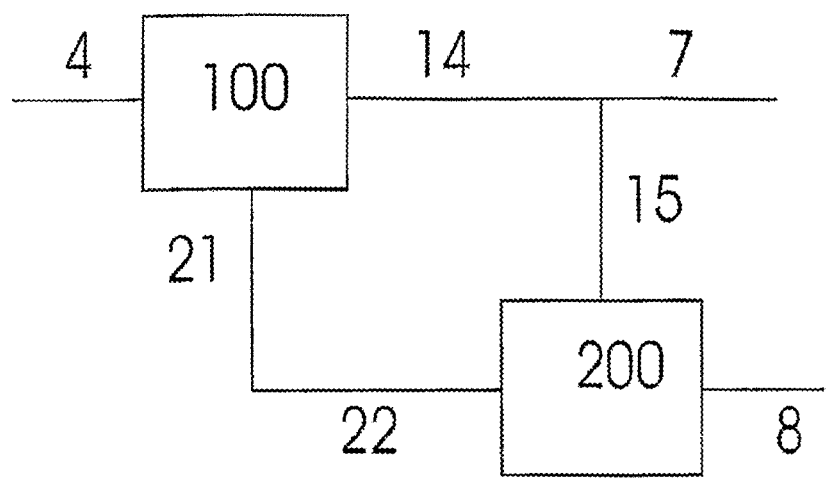
Fig. 6: Block diagram representation of transmission for hybrid systems

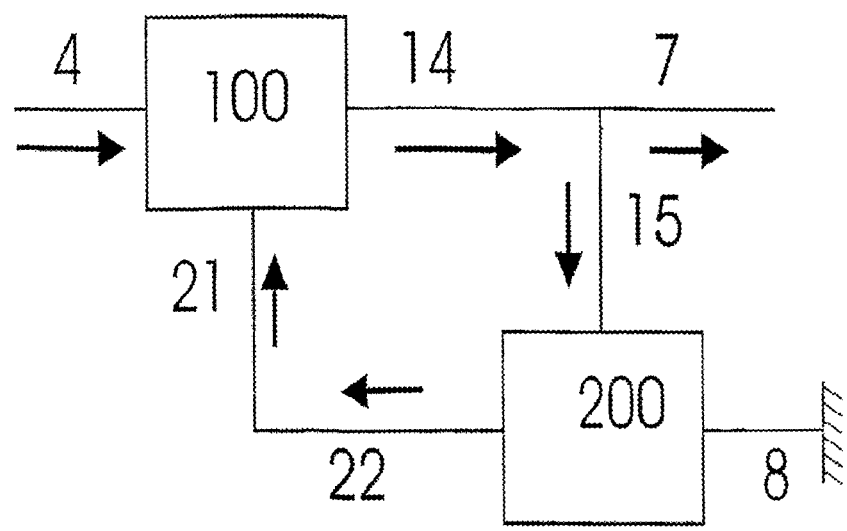
Fig. 7: Direction of recirculation of power when only the motor is operating in mode 3

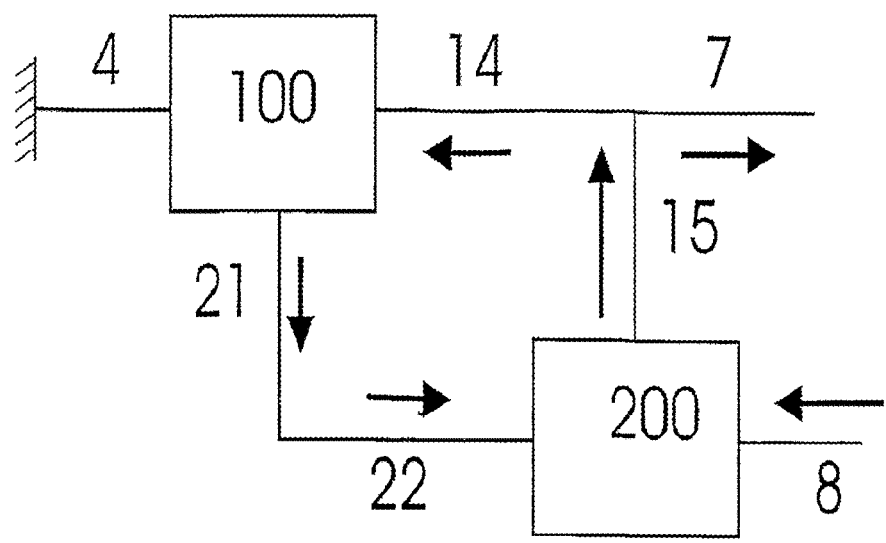
Fig. 8: Direction of recirculation of power when only the engine is operating in mode 3

HYBRID TRANSMISSION SYSTEM

FIELD OF INVENTION

The present invention relates to an improved transmission system with two prime movers to add power to drive a load and of splitting the power of a prime-mover or that available from the load into different parts in a manner to limit the re-circulating power to a fraction of the input power.

BACKGROUND

A transmission is a mechanism train, which consists of various series and parallel combinations so that the driven member of one mechanism is the driver for another mechanism (Ref: J E Shigley and J J Uickers, Theory of Machines and Mechanisms, Second Edition, McGraw Hill, 1995). If there is a single input to the transmission to drive the output, then the transmission is single degree of freedom. If a multitude of inputs are required to drive the outputs, then the transmission is multiple degree of freedom mechanism. Simple transmissions consist of series combinations only and are single degree of freedom. Planetary gear transmissions or trains (PGTs) are characterized by the presence of parallel combinations. A simple PGT has two degrees of freedom. In a transmissions with parallel combination, it is possible to have internal power loops existing and power flowing in such loops is called re-circulating power. In some cases re-circulating power in a transmission can exceed the input power by a large factor.

The invention being described here is useful for situations where there is no single operating point of a system. An example of such a system is a machine tool, which operates at different operating conditions of depth of cut, cutting speeds and feed rates depending on the geometry, material and processing sequence. Another example of such a system is a vehicle, which operates at different speeds and load conditions depending on the traffic, road grade, etc. Yet another example of such a system is a legged mobile system where there are two distinct phases of operation for each leg—namely, stance phase and transfer phase.

In the examples considered above, it may be useful to have multiple prime movers, each suited to some range of operating points. A combination of power from such prime movers is also envisaged in other ranges of operating points.

In the case of a machine tool spindle drive, an electric drive will operate efficiently at some range of motor speeds and torques. If during some cutting operations, the motor speed or the torque demanded of the motor or both were much different as compared to the efficient range, then the drive motor may consume large amount of input power compared to the power delivered at the spindle. Thus, it is desirable from the point of efficiency of operation that two prime movers be used to drive the spindle.

In the case of the legged walking machines, the legs supporting the weight of the machine typically move at slow speed but under substantial loads. The legs in transfer mode, on the other hand, move in the air where the speeds are high while the loads are small (see for example, Kharade, A, Issac, K. K., Amarnath, C., Seth, B. et al "Nataraj: A Six Legged Walking Robot for Nuclear Power Plants", Proceedings of the PLANET CARRIERS 2002 Conference, Thiruvanthapuram, India, November 2002). A single motor catering to both the requirements would not always operate most efficiently.

In the case of an automobile, it is well known that the best efficiency and least pollution operations correspond to narrow ranges of operating parameters. However, the automobile has to operate in conditions that are dictated by the traffic and road conditions, coupled with vagaries of power requirements like those in parking, reversing, cruising, and idling, which often result in operation outside the desirable ranges of operating parameters. For example, efficiency is low and rate of pollution is high in automobiles at the starting conditions.

Vehicles driven only by cleaner power sources such as electric batteries have been sought as a way to overcome problem of ICE pollution. However, the requirements of travel duration, maintaining speed during grade climbing and sufficiency of acceleration for meeting performance specifications—have only been met with consequent larger sizes of batteries to power the motor. The alternatives to conventional batteries—fuel cells, photovoltaic cells, etc., are currently being explored but each has its set of problems. The problems like unavailability of hydrogen refilling stations hinder the commercial implementation of fuel cell technology. The size of solar panels is a hindrance to the use of photovoltaic cells. Another prime-mover that does not pollute and is suited to powering the wheels at low speeds can be integrated into the automobile system if a suitable hybrid transmission system is used.

Hybrid Electric Vehicles—assimilation of electric power with power of the conventional ICE—consequently, have been sought as a compromise. A Hybrid Vehicle transmission would accept two inputs, i.e., an ICE and an electrical motor, whereas the transmission gearbox of an ordinary vehicle would accept only one input, i.e., an ICE.

In HEVs, electric motor is powered from an on-board source of power, such as a battery. If a HEV has to be practically feasible, battery will have to be periodically charged. A desirable way to charge the battery is to utilize the overhauling characteristics of the load while retarding (regenerative braking). Another way to charge the battery is to utilize part of the power from the IC engine. The HEV transmission should permit driving a generator, which would make electric power available for charging the battery in both cases. This could be achieved by using a dedicated generator or possibly by using the electric motor itself as a generator. The latter has the advantage of fewer components in the system. (Ref: Tsai L. W., Schultz G., Higuchi N., A Novel Parallel Hybrid Transmission, Trans. ASME, Journal of Mechanical Design, Vol. 123, June 2001, pp. 161-168.)

HEVs come primarily in two configurations—series and parallel. Series configuration was the first attempt to circumvent the large size of batteries required for an extended travel. This is achieved by an ICE, dedicated solely for the purpose of charging batteries. The ICE working point is therefore chosen freely. Since power flows from ICE to the battery (via a generator) first and then from battery to the motor, there are extra power conversions required in this configuration. This leads to reduced system efficiency. In a parallel HEV, either of the electric motor and ICE or both can drive the vehicle. A single motor capable of doubling up as a generator also suffices. There are fewer power conversions, which help increase the vehicle efficiency. In a parallel HEV there are at least three modes of operation possible: pure electrical, pure ICE and power operation with both the sources. In some of these cases, it may be possible to charge batteries in regenerative way.

A spin-off of parallel HEV is a Power-Split Hybrid (PSH). A generator is included in this system to keep charging the battery. The drawback of this arrangement is that it is unable to transmit the entire engine torque to the output shaft and it needs two electrical machines. (Ref: Jonasson K., Analyzing Hybrid Drive System Topologies, Licentiate Thesis, Lund University, Sweden, 2002)

DESCRIPTION OF PRIOR ART

Numerous attempts have been made in the past to materialize the concept of HEVs. For example U.S. Pat. No. 4,405,029 describes A HEV, which utilizes waste heat contained in the engine exhaust. This exhaust is made to generate steam in a chamber, where water is injected. The steam generated is made to rotate a turbine that helps operate the motor as a generator and hence charge a battery. In another embodiment described therein the exhaust gases are passed over a series of photovoltaic devices, which absorb heat radiantly and help generate electricity. This patent does not teach the use of transmission for the hybrid electric vehicle.

U.S. Pat. No. 6,371,878 describes An Electric Continuously Variable Transmission; U.S. Pat. No. 5,789,823 describes An Electric Hybrid Transmission—both suffer from a common problem of using a hydraulic torque converter to connect the engine to the transmission. Such torque converters have been reported to be inefficient. (Ref: Hydraulic Machinery by Jagdish Lal; published by Metropolitan Book, Delhi; India, 1961)

PCT publication WO 03/035422 describes A Power Split Hybrid Transmission wherein an engine drives a planetary gear train; U.S. Pat. No. 5,643,119 describes A Power Split Hybrid Transmission; U.S. 20010023790 describes A Transmission Unit for HEV using a Continuously Variable Transmission (CVT); U.S. Pat. No. 6,371,878 mentioned above; U.S. Pat. No. 5,935,035 describes An Electro-mechanical Power Train; U.S. Pat. No. 5,931,757 describes A Two-mode, Compound Split, Electro-mechanical Vehicular Transmission; U.S. Pat. No. 5,577,973 describes A Two-mode, Split Power, Electro-mechanical Transmission; U.S. Pat. No. 5,730,676 describes A Three-mode, Input Split Hybrid Transmission. All these inventions suffer from a common problem of using two or more electrical machines to control the passage of power. All these inventions describe the use of Power Split Hybrid configuration for HEVs, wherein the input power is always split into two requirements: battery charging and vehicle motion. (Ref: Jonasson K., Analyzing Hybrid Drive System Topologies, Licentiate Thesis, Lund University, Sweden, 2002). Further, the use of two or more electrical machines implies additional weight and space that would be needed for the system.

D. E. 19,606,771 describes A Hybrid Drive for an Automobile using Freewheel Coupling between IC Engine and CVT. It uses three planetary gear trains to transmit the power. U.S. Pat. No. 6,090,005 describes A Two-mode, Compound-split Vehicular Transmission and U.S. Pat. No. 5,935,035 describes An Electro-mechanical Power Train. These two achieve their respective objectives using four conjoined planetary gear trains. Subsequent works like U.S. Pat. No. 6,592,484 show that the use of two conjoined planetary gear trains can suffice. For identical specifications, lesser number of planetary gear trains implies a more compact transmission.

U.S. Pat. No. 6,592,484 describes A Transmission Gearbox for Parallel Hybrid Electric Vehicles, which uses a seven link compound planetary gear train. In mode 5, clutch (numbered 61 in the above-mentioned patent document) is engaged and the transmission operates as a CVT, with motor operating as a generator. From the basic kinematic equation of planetary gear trains, the speed of the output shaft would be the difference of the speeds of the ICE and the generator. For the embodiments described therein, this mode suffers from the drawback that for a given set of operating parameters, large power re-circulates within the gear train at different speed ratios. This problem can be illustrated using the methodology described in: A Continuously Variable Power Split Transmission for Automotive Applications, SAE Paper 970687 authored by Mucino V H, Smith J E, Cowan B & Kmicikiewicz M. For the principal embodiment: for an overall speed ratio (speed of output to speed of input) of 1:2 and ratio of number of sun teeth to the teeth on the ring gear as 1:2, the magnitude of recirculating power is 50 times the input power; while for an overall speed ratio of 0.55 and ratio of teeth as 0.4, the magnitude of the recirculating power is 40 times the input power.

In much the same vein, in the alternate embodiment described in FIG. 11 in U.S. Pat. No. 6,592,484, in operational mode 3, for an overall speed ratio of 0.2 and ratio of teeth as 0.5 the magnitude of recirculating power is 80 times the input power. This invention suffers from the disadvantage that excessive load would be imposed on gear teeth due to high re-circulating power.

Thus, a need exists to materialize a parallel HEV transmission with a two degrees-of-freedom mechanism. The mechanism should avoid use of inefficient fluid torque converters; use a single electric machine that can act as both motor and generator so as to reduce the space and weight of the system. The mechanism needs to allow operation with combination of the prime movers and also allow each of them to operate in isolation. The mechanism should provide sufficient number of gear ratios with the least possible number of conjoined planetary gear trains. The mechanism should limit re-circulating power to remain below input power.

SUMMARY OF THE INVENTION

The main object of the invention is to provide an improved two degrees-of-freedom transmission system that allows addition of power from two prime-movers to drive a load and simultaneously limit the re-circulating power in the system to a fraction of the input power.

It is an object of the invention to provide a two degrees-of-freedom transmission system that would limit re-circulating power to less than the input power at all times.

It is yet another object of the invention to use a compound planetary gear train for a two degrees-of-freedom parallel hybrid transmission.

It is yet another object of the invention to have a transmission that would add the power from the prime movers and deliver the combined power to the output.

It is yet another object of the invention to provide a transmission that would allow the prime movers to operate simultaneously and also in isolation.

It is yet another object of the invention to provide a transmission that would allow charging the energy storage system using the power from one of the prime-movers while fulfilling the output requirements.

It is yet another object of the invention to provide a transmission system that allows returning power to the energy storage system from the kinetic energy of the retarding load.

In accordance with the above-mentioned objects a hybrid transmission is disclosed comprising a compound planetary gear train with two conjoined planetary gear trains, two prime movers and their respective shafts, an output shaft and four torque-transfer devices. The compound planetary gear train comprises of a conjoined ring gear, planet carrier of the first planetary gear train that conjoins with sun of the second planetary gear train. The disclosed PGT yields different modes of operation for different states of various torque-transfer devices.

BRIEF DESCRIPTION OF DRAWINGS

FIG. 1 shows the principal embodiment of prior art—U.S. Pat. No. 6,592,484.

FIG. 2 shows alternate embodiment of prior art—U.S. Pat. No. 6,592,484.

FIG. 3 shows yet another alternate embodiment of prior art—U.S. Pat. No. 6,592,484.

FIG. 4 shows yet another alternate embodiment of prior art—U.S. Pat. No. 6,592,484.

FIG. 5 shows the schematic sketch of the principal embodiment of the current invention.

FIG. 6 shows the block diagram representation of the gear train of FIG. 5.

FIG. 7 shows the power flow directions and also the recirculating power flow when only the motor is operating and the link corresponding to the engine has been assumed to be fixed.

FIG. 8 shows the power flow directions and also the recirculating power flow when only the engine is operating and the link corresponding to the motor has been assumed to be fixed.

DETAILED DESCRIPTION

The hybrid transmission is shown in FIG. 5. It is a two degrees-of-freedom compound planetary gear train. The gear train consists of motor 1, an engine 10, an auxiliary driving mechanism 300 comprising of a driving member 12, another driven member 13—preferably but not necessarily both gears, four torque transfer devices: two clutching devices 9 and 3, two braking devices 2 and 5. Torque transfer devices—2 and 5 help reduce the mobility of the gear train from two degree-of-freedom to one degree-of-freedom.

Compound planetary gear train consists of a first planetary gear train 100 and a second planetary gear train 200. The first planetary gear train 100 and second planetary gear train 200 have ring gear 6 as the conjoining member. The part of ring gear 6 that belongs to first planetary gear train 100 has been labeled 21 and that belonging to second planetary gear train 200 has been labeled 22. First planetary gear train planet carrier 14 and second planetary gear train sun 15 conjoin as a common member to both thru the shaft 7. Second planetary gear train planet carrier 16 is connected to the driven member 13 of the auxiliary driving mechanism 300 thru the hub 8. The driving member 12 of the auxiliary driving mechanism 300 is connected to torque transfer device 9 thru the shaft 17; the engine 10 is connected to torque transfer device 9 thru shaft 18. The driving member 12 and the driven member 13 of the auxiliary driving mechanism are operatively connected to each other. The output driving mechanism 400 comprises of the driving member 19 and the driven member 11—both preferably but not necessarily gears. The driven member 11 and the driving member 19 of the output driving mechanism 400 are operatively connected to each other. The driving member 19 of the output driving mechanism 400 is connected to the shaft 7 carrying the second planetary gear train sun 15 and first planetary gear train planet carrier 14. The ring gear 6 can be grounded by torque transfer device 5. The motor 1 drives the first planetary gear train sun 4 thru shaft 20. Shaft 20 can be grounded using torque transfer device 2 and can also be coupled to ring gear 6 thru torque transfer device 3. Engine 10 drives the driving member 12 of the auxiliary driving mechanism 300 selectively thru torque transfer device 9; the driving member 12 in turn drives the driven member 13 of the auxiliary driving mechanism 300 and in turn drives second planetary gear train planet carrier 16 thru hub 8. Motor 1 drives first planetary gear train sun 4.

FIG. 6 portrays the compound planetary gear train of the current invention in block diagram fashion.

FIG. 7 portrays the recirculation of power in the block diagram of FIG. 6 with only the motor 1 operating. Input power from the motor 1 is added to the re-circulating power in the loop 100-14-15-200-22-21-100. Power flowing in planet carrier 14 of planetary gear train 100 branches into output power in shaft 7 and recirculating power in the loop.

FIG. 8 portrays the recirculation of power in the block diagram of FIG. 6 with only the engine 10 operating. Input power from the ICE 10 through member 8 is added to the re-circulating power in the loop 200-15-14-100-21-22-200. Power flowing in sun 15 of planetary gear train 200 branches into output power in shaft 7 and re-circulating power in the loop. The direction of recirculating power is seen to be in opposite direction with respect to FIG. 7.

The different modes of working of the invention are illustrated, with non-limiting example of a HEV transmission. Table 1 lists down the different modes.

The first mode of operation of the invention is referred to as the pure electric mode. This mode is made use of when the vehicle is starting from standstill or is running at very low speeds. To use this mode, torque transfer device 5 is engaged and grounds the ring gear 6 to the transmission case. The entire power transfer takes place thru the first planetary gear train 100, whereas second planetary gear train 200 is unloaded. The power flow path is 1-20-4-14-7-400.

The next mode of operation called the power mode 1, comes from engagement of torque transfer device 9 with torque transfer device 5 still engaged. Having reduced the two degrees-of-freedom mechanism to a single degree-of-freedom mechanism, with the engagement of torque transfer device 5, the two inputs to the mechanism—motor 1 and engine 10 cannot be moved independently. This mode of operation can be used to crank start the engine 10. It can also be used for the charging operation. If the state of charge of the energy storage system 51 is above a threshold, then either of the prime movers can be controlled in relation to the speeds of the output and the other prime mover. If the state of charge of the energy storage system is below the desirable limits, then engine 10 should be controlled to drive the motor as a generator. The high ratio that is obtained due to engine 10 driving the planet carrier 16 of the second planetary gear train 200 and output being derived from second planetary gear train 200 sun 15. This allows net regeneration even at moderate ICE speeds.

The next mode of operation called the power mode 2, is the pure hybrid mode, in which only the torque transfer device 9 is engaged. The inputs to the mechanism—engine 10 and motor 1 can be independently moved as per any control objective. The power flow can be obtained from superposition of FIG. 7 and FIG. 8.

The next mode of operation called power mode 3, is the planetary gear train rigid body rotation mode, in which two torque-transfer devices 9 and 3 are engaged. The engagement of torque transfer device 3 couples the ring gear 6 with the shaft 20 that carries the motor 1 and FIRST PLANETARY GEAR TRAIN sun 4.

The next mode of operation called engine mode 1 comes from the engagement of the torque transfer device 9 and 2. The engagement of torque transfer device 2 grounds the shaft 20 carrying the motor 1 and first planetary gear train sun 4 to the transmission case. The engine 10 drives the vehicle completely thru the second planetary gear train 200 subject to the constraints imposed by first planetary gear train 100. This is a reduction mode, which provides fail-safe nature to the transmission i.e. if the motor and/or the battery do not function for some reason, the engine 10 will still be able to drive the vehicle in reduction ratio. The motor is stationary in this mode. The power flow has been depicted in FIG. 8.

The next mode of operation called the engine mode 2 comes from the engagement of the torque transfer device 9 and the torque-transfer device 5 simultaneously. Here the engine 10 drives the vehicle completely thru the second planetary gear train 200 and motor 1 can be switched off and would consequently freewheel. This is an overdrive mode. The power flow path is 10-18-9-17-300-8-16-15-7-400.

Power regenerating function can be achieved when the vehicle retards and the output shaft serves to pump the kinetic energy of the retarding vehicle back into the energy storage device for later use. The engine 10 may also be called upon to charge the energy storage system if the state of charge of the energy storage system falls below a set limit.

One of the regenerative modes of operation used for charging the batteries is possible in engine mode 2, wherein the torque transfer devices 9 and 5 both are engaged. The power would flow out thru the first planetary gear train sun 4 to shaft 20 to motor 1 working as a generator to the energy storage system.

Another regenerative mode of operation is possible in power mode 3 wherein both the torque transfer devices 9 and 3 are engaged and the mechanism runs in rigid body rotation mode.

Another regenerative mode of operation is possible in power mode 2 wherein only the torque transfer device 9 is engaged and the mechanism runs in pure hybrid mode.

Another regenerative mode of operation is possible in power mode 1 wherein both the torque transfer devices 9 and 5 are engaged simultaneously.

Another regenerative mode of operation is possible in pure electric mode of operation. Here the kinetic energy of the retarding vehicle can be used to charge the energy storage system by operating the motor as a generator.

gear train 100 and second planetary gear train 200, respectively and there is no re-circulation of power. However, power would recirculate in the hybrid mode—power mode 2. To compute its magnitude, the methodology given in: *The determination of Power Flow in Multiple-path Transmission Systems*, Mechanism and Machine Theory, Vol. 7, 1972, pp. 103-109, authored by D. J. Sanger, has been used.

Case a: If only the motor operates and the link driven by the engine is fixed. The equations yield the magnitude of recirculating power to be:

$$\frac{Z_{21-4}Z_{15-22}}{1+Z_{21-4}Z_{15-22}}$$

This would always be less than one and the power recirculates in the direction as shown in FIG. 7.

Case b: If only the engine operates and the link driven by the motor is fixed. The equations yield the magnitude of recirculating power to be:

$$\frac{1}{1+Z_{22-15}+Z_{22-15}Z_{4-21}}-1$$

re-circulating in the direction as shown in FIG. 8. This also would always be less than one. Power Mode 2: operation of both the power sources simultaneously leads to even smaller power recirculation, since direction of both the above (Case a and Case b) powers are opposite to each other and both are less than one.

An improved hybrid transmission has been disclosed that allows the addition of plurality of prime-movers to drive a load using a compound planetary gear train and four torque-transfer devices. The transmission system also allows splitting the power from one of the prime-movers between the charging requirements of the energy storage system and the

TABLE 1

Modes of operation of proposed mechanism

| Sr. No. | Operating mode | Torque transfer device engaged | | | | Comment |
|---|---|---|---|---|---|---|
| | | 9 | 3 | 5 | 2 | |
| 1. | Electric-E1 | | | | • | Engine idling or stopped |
| 2. | Power mode 1-P1 | • | | • | | Motor |
| 3. | Power mode 2-P2 | • | | | | Motor |
| 4. | Engine mode 1 (reduction)-EN1 | • | | | • | Motor stationary |
| 5. | Power mode 3-P3 | • | • | | | Motor |
| 6. | Engine mode 2 (overdrive)-EN2 | • | | • | | Motor freewheeling |
| 7. | Regenerative braking mode 1-R1 | • | | • | | Generator |
| 8. | Regenerative braking mode 2-R2 | • | • | | | Generator |
| 9. | Regenerative braking mode 3-R3 | • | | | | Generator |
| 10. | Regenerative braking mode 4-R4 | • | | • | | Generator |
| 11. | Regenerative braking mode 5-R5 | | | • | | Generator |

Recirculating Power Analysis of Current Gear Train

A block diagram representation of the current work is shown in FIG. 6. In single input modes—electric and overdrive—the power flow would take place thru first planetary requirements of the output, in a manner to limit the re-circulating power to a fraction of input power. The transmission system also allows charging the energy storage system using kinetic energy available from the retarding load.

The invention claimed is:

1. A transmission system comprising:

a transmission case;

a compound planetary gear train, comprising a first planetary gear train having a plurality of planetary gear train members and a second planetary gear train having a plurality of planetary gear train members;

said first planetary gear train comprising a sun gear, a ring gear and a plurality of planet gears operationally engaging both said sun gear and said ring gear and operationally connected to a first planet carrier;

said second planetary gear train comprising a sun gear, a ring gear and a plurality of planet gears operationally engaging both said sun gear and said ring gear and operationally connected to a second planet carrier;

said ring gear of said first planetary gear train conjoined to said ring gear of said second planetary gear train and said first planet carrier conjoined to said sun gear of second planetary gear train;

a first prime mover having a first drive shaft operationally connected to said sun gear of said first planetary gear train and in power communication with an energy storage device, operable to transfer power between said energy storage device and said first drive shaft;

a second prime mover having a second drive shaft selectively operatively connectable to an auxiliary driving mechanism which is operatively connected to said second planet carrier, the conjoining of members of said first planetary gear train and members of said second planetary gear train and the positioning of said first prime mover and said second prime mover ensuring that the re-circulating power does not exceed the input power;

an output shaft operatively connected to said first planet carrier and said sun gear of said second planetary gear train;

a first torque transfer device positioned to selectively operatively connect said second drive shaft to said auxiliary driving mechanism;

a second torque transfer device positioned to selectively operatively connect said ring gear of said first planetary gear train to said sun gear of said first planetary gear train;

a third torque transfer device positioned to selectively operatively connect said ring gear of said first planetary gear train and said ring gear of said second planetary gear train to said transmission case; and a fourth torque transfer device positioned to selectively operatively connect said sun gear of said first planetary gear train to said transmission case.

2. A transmission system as claimed in claim 1 wherein engaging said third torque transfer device and disengaging said first, second and fourth torque transfer devices brings said first prime mover in power communication with said output shaft.

3. A transmission system as claimed in claim 1 wherein engaging said first and third torque transfer devices and disengaging said second and fourth torque transfer devices brings said first prime mover and said second prime mover in power communication with said output shaft.

4. A transmission system as claimed in claim 1 wherein engaging said first torque transfer device and disengaging second, third and fourth torque transfer devices brings said first prime mover and said second prime mover in power communication with said output shaft.

5. A transmission system as claimed in claim 1 wherein engaging said first and second torque transfer devices and disengaging said third and fourth torque transfer devices brings said first prime mover and said second prime mover in power communication with said output shaft.

6. A transmission system as claimed in claim 1 wherein engaging first and fourth torque transfer devices and disengaging second and third torque transfer devices brings said second prime mover in power communication with said output shaft.

7. A transmission system as claimed in claim 1 wherein said first prime mover is an electrical machine operable as one of i) a motor and ii) a generator; and wherein said energy storage device comprises at least one of i) a battery, ii) a capacitor, and iii) a fuel cell.

8. A transmission system as claimed in claim 1 wherein said first prime mover is a fluid-power machine operable as one of i) a fluid motor and ii) a pump/compressor; and wherein said energy storage device comprises at least one of i) a power pack and ii) an accumulator.

9. A transmission system as claimed in claim 1 wherein said energy storage device is charged through said first prime mover with power from at least one of i) retarding motion and ii) said second prime mover.

* * * * *